US011556523B2

(12) United States Patent
Kruempelmann et al.

(10) Patent No.: US 11,556,523 B2
(45) Date of Patent: Jan. 17, 2023

(54) CALCULATING ORDER DEPENDENCY IN CONFIGURATION ACTIVATION FOR COMPLEX SCENARIOS

(71) Applicant: SAP SE, Walldorf (DE)

(72) Inventors: Wulf Kruempelmann, Altlussheim (DE); Susanne Schott, Mannheim (DE)

(73) Assignee: SAP SE, Walldorf (DE)

( * ) Notice: Subject to any disclaimer, the term of this patent is extended or adjusted under 35 U.S.C. 154(b) by 370 days.

(21) Appl. No.: 16/937,288

(22) Filed: Jul. 23, 2020

(65) Prior Publication Data

US 2022/0027347 A1     Jan. 27, 2022

(51) Int. Cl.
*G06F 16/23* (2019.01)
*G06F 16/245* (2019.01)
*G06Q 10/10* (2012.01)

(52) U.S. Cl.
CPC ........ *G06F 16/2379* (2019.01); *G06F 16/245* (2019.01); *G06Q 10/10* (2013.01)

(58) Field of Classification Search
CPC .... G06F 16/2379; G06F 16/245; G06Q 10/10
USPC .......................................................... 707/703
See application file for complete search history.

(56) References Cited

U.S. PATENT DOCUMENTS

| | | | | |
|---|---|---|---|---|
| 10,169,378 | B2* | 1/2019 | Sassin | G06F 16/211 |
| 2011/0231454 | A1* | 9/2011 | Mack | G06F 16/258 |
| | | | | 707/803 |
| 2016/0078064 | A1* | 3/2016 | Sassin | G06F 16/211 |
| | | | | 707/606 |
| 2017/0286474 | A1* | 10/2017 | Sramka | G06F 16/9024 |
| 2022/0188282 | A1* | 6/2022 | Kruempelmann | G06F 9/45558 |
| 2022/0215020 | A1* | 7/2022 | Vanhooser | G06F 16/2452 |

* cited by examiner

*Primary Examiner* — Joshua Bullock
(74) *Attorney, Agent, or Firm* — Mintz Levin Cohn Ferris Glovsky and Popeo, P.C.

(57) ABSTRACT

In some implementations a method may be providing that includes importing database tables from a source system to a target system; obtaining, from a data dictionary, a first metadata about a foreign key association for a first database table to at least one of the database tables; obtaining, from a scan of code, a second metadata about an after import method for the first database table; in response to the second metadata representing that the after import method does not exist for the first database table, storing the first database table in the order table; and in response to the second metadata representing that the after import method does exist for the first database table, scanning for a first indication that the after import method corresponds to a read of at least one other database table before storing the first database table in the order table.

19 Claims, 8 Drawing Sheets

CALCULATING ORDER DEPENDENCY IN CONFIGURATION ACTIVATION FOR COMPLEX SCENARIOS

BACKGROUND

Many organizations may rely on enterprise software applications including, for example, enterprise resource planning (ERP) software, customer relationship management (CRM) software, and/or the like. These enterprise software applications may provide a variety of functionalities including, for example, invoicing, procurement, payroll, time and attendance management, recruiting and onboarding, learning and development, performance and compensation, workforce planning, and/or the like. Some enterprise software applications may be hosted by a cloud-computing platform such that the functionalities provided by the enterprise software applications may be accessed remotely by multiple end users. For example, an enterprise software application may be available as a cloud-based service including, for example, a software as a service (SaaS) and/or the like.

SUMMARY

Methods, systems, and articles of manufacture, including computer program products, are provided for calculating order dependency. The method may include importing database tables from a source system to a target system, the importing of the database tables performed in a sequence found in an order table, wherein the sequence determination of the order table is determined by at least: obtaining, from a data dictionary, a first metadata about a foreign key association for a first database table to at least one of the database tables; obtaining, from a scan of code, a second metadata about an after import method for the first database table; in response to the second metadata representing that the after import method does not exist for the first database table, storing the first database table in the order table; and in response to the second metadata representing that the after import method does exist for the first database table, scanning for a first indication that the after import method corresponds to a read of at least one other database table before storing the first database table in the order table.

In some variations, one or more of the features disclosed herein including the following features can optionally be included in any feasible combination. The order table may be searched for a database table to determine if the database table is included in the order table. In response to the database table being included in the order table, a search may be performed for a predecessor object, wherein the predecessor object comprises a predecessor database table and/or a predecessor foreign key connection to the database table. In response to the predecessor object being listed in the order table earlier than the database table, using the order table for the sequence when storing the database table. In response to the predecessor object not being listed earlier than the database table, a circle connection associated with the database table is flagged in the order table. The circle connection may be processed by storing the database table in the order table by leaving blank at least one field which is read from a plurality of other database tables that are a part of the circle connection and then filling the at least one field left after the other plurality of other database tables are stored in the ordered list. In response to the database table not being included in the order table, a search may be performed for a predecessor object and then stored the database table in the order table after the predecessor object. The sequence determination of the order table may be determined for each of the database tables being imported. In response to the second metadata representing that the after import method does exist for the first database table and in response to the after import method not requiring the read of the at least one other database table, the first database table is stored at an earlier position in the order table when compared the at least one other table.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the virtualization of configuration data, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, like labels are used to refer to same or similar items in the drawings.

DETAILED DESCRIPTION

In some complex computer systems, such as complex database system, enterprise resource planning (ERP) systems, and the like, there may be a considerable quantity of tables for various scenarios, such a processes, flows, and the like being handled by the computer systems. Many of these tables include data that depends on other data, which depends on other data, and so forth. This results in a complex structure of foreign key (FK) associations that provide connections between the tables. Although the structure of the connections may a simple linear connection between tables (e.g., table A linked by a FK to table B), it can often take a more complex form, such as fork connections, a circular connection, and the like.

After data is imported into a database table for example, a method may generate, based on the imported data, additional data (e.g., data, objects, repository objects, programs, other tables, and the like). For example, this method may be an after import method that is associated with a first table. This after import method (AIM) may read data from at least a second table (which may associated with an AIM as well). In this example, the first table depends from the second table, but the dependency is not apparent until the AIM is executed (or at the very least evaluated). These examples illustrate the complex ordering and dependencies related to the importation of data into database tables.

In some embodiments, there is provided an automated process for determining an order, based on metadata, for importing database tables and their associated data. Metadata may be selected from a data dictionary, and metadata (which indicates which tables are read and written) may be selected from after import methods. The metadata may be used to determine a proper order (e.g., serialization of the import order) for the importation of table including data.

In some embodiments, metadata may be selected (e.g., retrieved, obtained, and the like) from a data dictionary. This metadata may be for a table identified for transport, such as transporting data from a source system to import into a target system. The metadata may include a description of the table, such as formal database view description of the identified table. The identified table may be associated with a common object, so the selected metadata enables storage of the table associated with the object (as well as other tables associated with the common object). This object may also be associated with (or include) one or more after import methods. Next, a data dictionary may be read in order to select foreign key (FK) connections to other tables and views.

If an AIM and a foreign key connection is not available or does not exist for a table, the table including its data may be stored in the target system without any concern for dependency related ordering issues. If, however, there is a FK connection but no AIM, tables including their data may be stored based on a normal order selector as described below with respect to FIG. 2 at 234. If, however, there is an FK and an AIM, source code may be scanned and then checked to see which tables are read from during the AIM execution. If there is a table read, the tables (which are associated with the AIM) are insert into an ordered list of tables and processed as described below at FIG. 2 at 222. If there is not a table read, the tables (which are associated with the AIM) are insert into an ordered list of tables and processed as described below at FIG. 2 at 224.

Figure 1A:
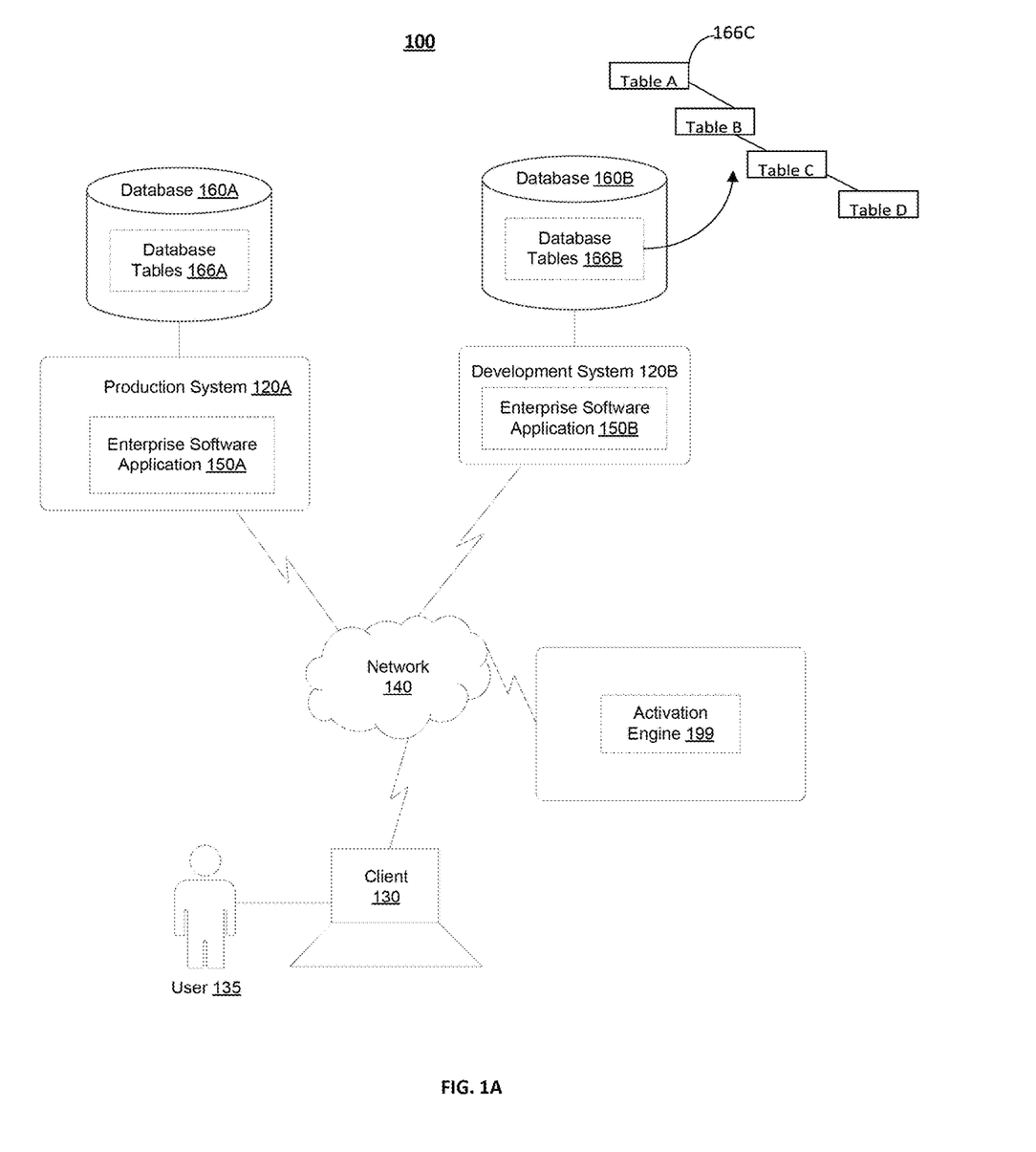
FIG. 1A depicts a system diagram illustrating a system 100 including an activation engine for calculating order dependency, in accordance with some example embodiments.

FIG. 1A depicts a system diagram illustrating a system 100, in accordance with some example embodiments. The system 100 may include an activation engine 199 configured to calculate order dependency, in accordance with some of the embodiments disclosed herein.

The system 100 may further include a target system, such as production system 120A, which hosts an application such as an enterprise software application 150A. The system 100 may also include a source system, such as a development system 120B, which hosts an application such as an enterprise software application 150B. The enterprise software applications 150A may access data stored in database tables 166A at database 160A, and the enterprise software applications 150B may access data stored in database tables 166B at database 160B. The system may also include a client 130. As shown in FIG. 1, the activation engine 199, the production system 120A, development system 120B, and client 130 may be coupled by a network 140. The network 140 may be a wired and/or wireless network including, for example, a wide area network (WAN), local area network (LAN), a virtual local area network (VLAN), the Internet, and/or the like. Moreover, the production system 120A and/or development system 120B may be a cloud-based system hosted on a cloud-computing platform.

Examples of the enterprise software applications 150A-B may include an enterprise resource planning (ERP) software application, a customer relationship management (CRM) software application, a supply chain management (SCM) software application, and/or the like. Accordingly, the enterprise software application may perform a variety of functions including, for example, procurement, invoicing, payroll, time and attendance management, recruiting and onboarding, learning and development, performance and compensation, workforce planning, and/or the like.

If database tables including data are to be imported into the production system 120A, it may be a very complex endeavor due to the dependency of the database tables and other factors. For example, if data is to be imported from the one or more database tables 166B to the database tables 166A, the activation engine 199 may determine an order for the import of data into the database tables 166A. To illustrate further, the user 135 at FIG. 1 may cause the import of the data into database tables 166A by requesting, via client 130, the activation engine 199 to begin a process for determining the order of the importation of the tables.

In some embodiments, the activation engine may take into account the FKs and AIMs to determine the order of the importation of database tables, so that the database tables are imported in a proper sequence.

Figure 1B:
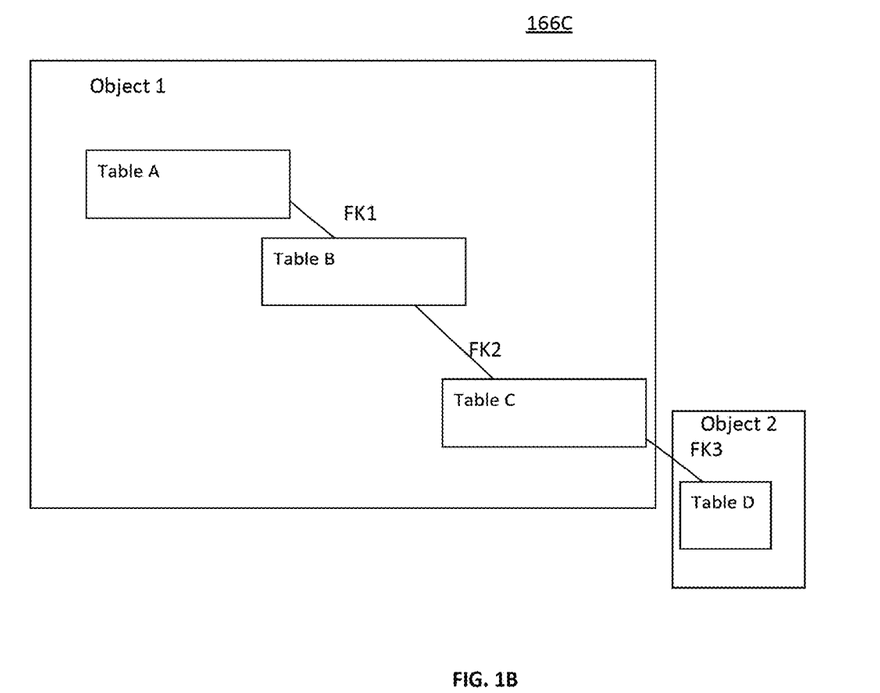
FIG. 1B-FIG. 1D depict examples of data structures, in accordance with some example embodiments.

In some embodiments, the activation engine 199 may generate an order table indicating a sequence for the importation the database tables (and, in particular the data included in those tables). FIG. 1B depicts an example of two objects including tables A-D 166C linked by the foreign keys (FKs), such as FK1, FK2, and FK3. In this example, table D reads from table C, which reads from table B, which reads from table A. In this simplified example, table A is at the top of the list so it is imported into the target system first, followed by table B, than table C, and lastly table D is at the bottom of the list so it is imported last. In other words, table D depends on table C since table D need to read from table C; table C depends on table B since table C reads from table B; and table B depends from table A since table B reads from table A. The activation engine may take into account these dependencies as well as the FKs (and, if present, the AIMs associated with these tables) to determine the proper order of the importation of database tables.

Figure 1C:
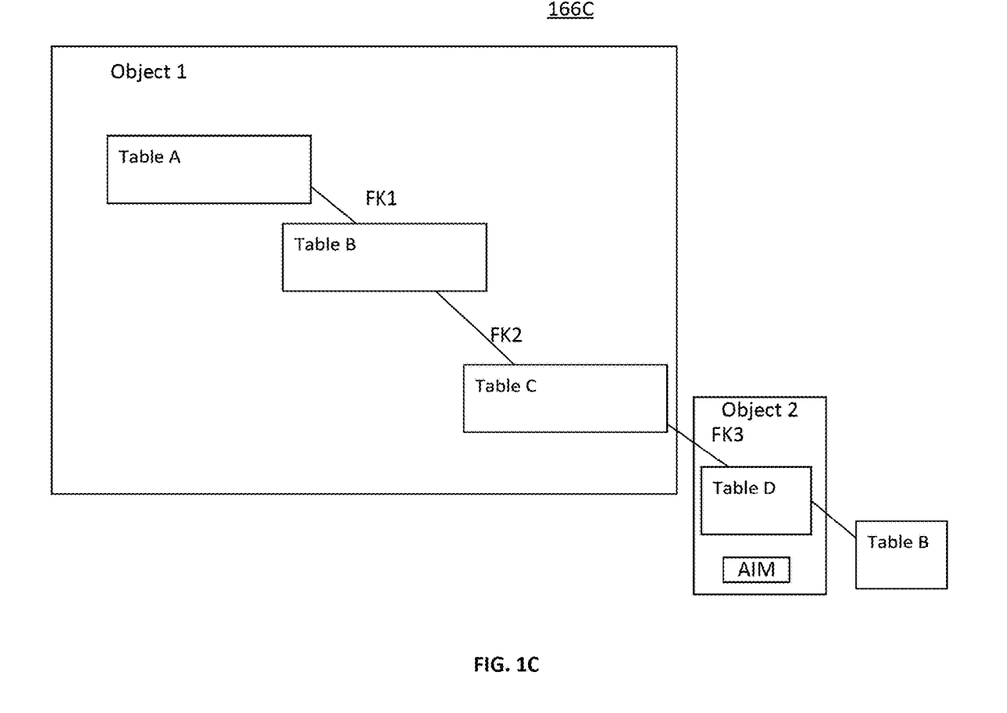
Figure 1D:
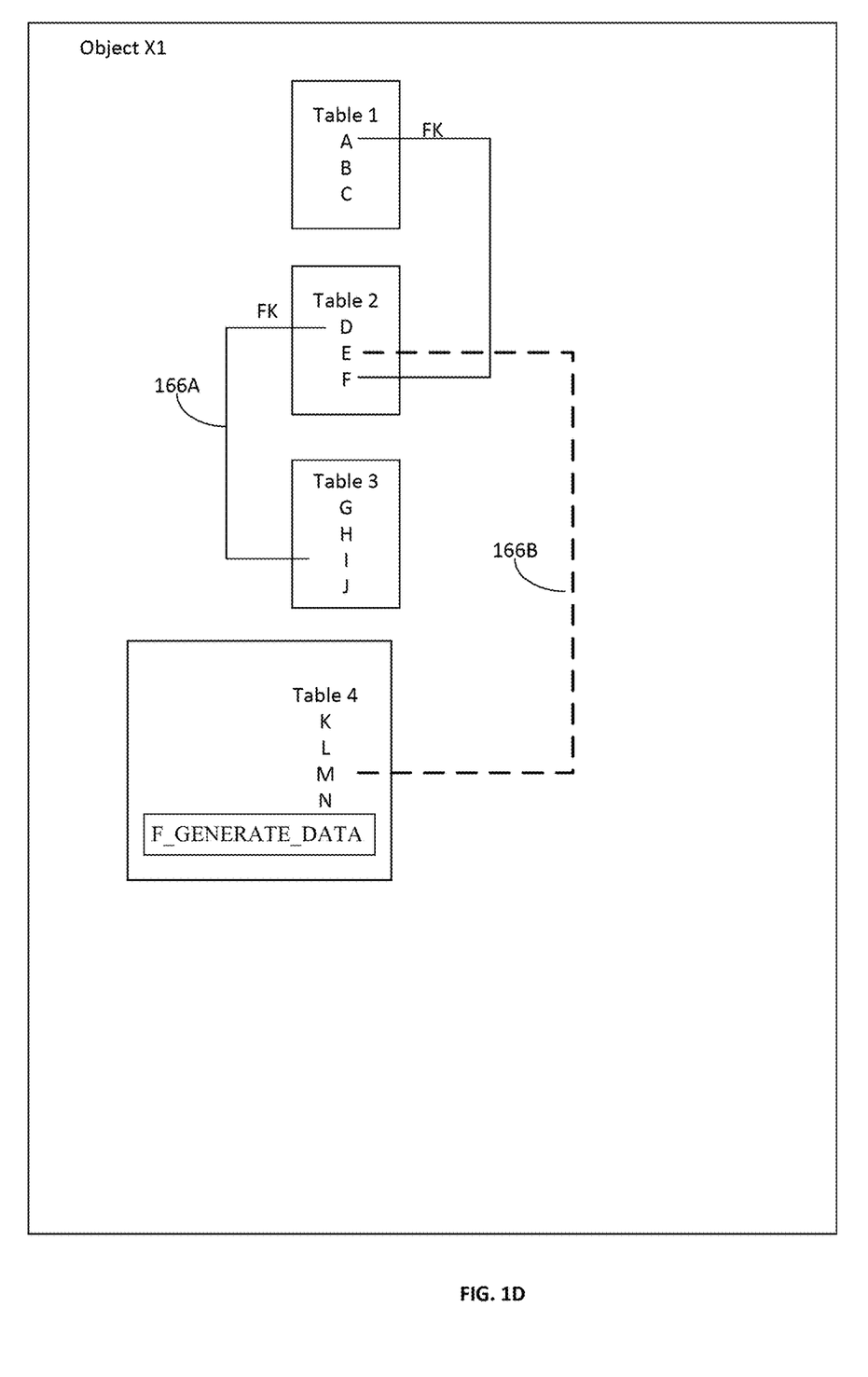

FIG. 1C depicts an example of two objects, which is similar to FIG. 1B but the second object at table D includes an AIM which reads table B of object 1. FIG. 1D depicts an object X1 including table 1 with fields A, B, C, table 2 with fields D, E, F, table 3 with fields G, H, I, J, and table 4 with fields K, L, M, N.

Figure 2:
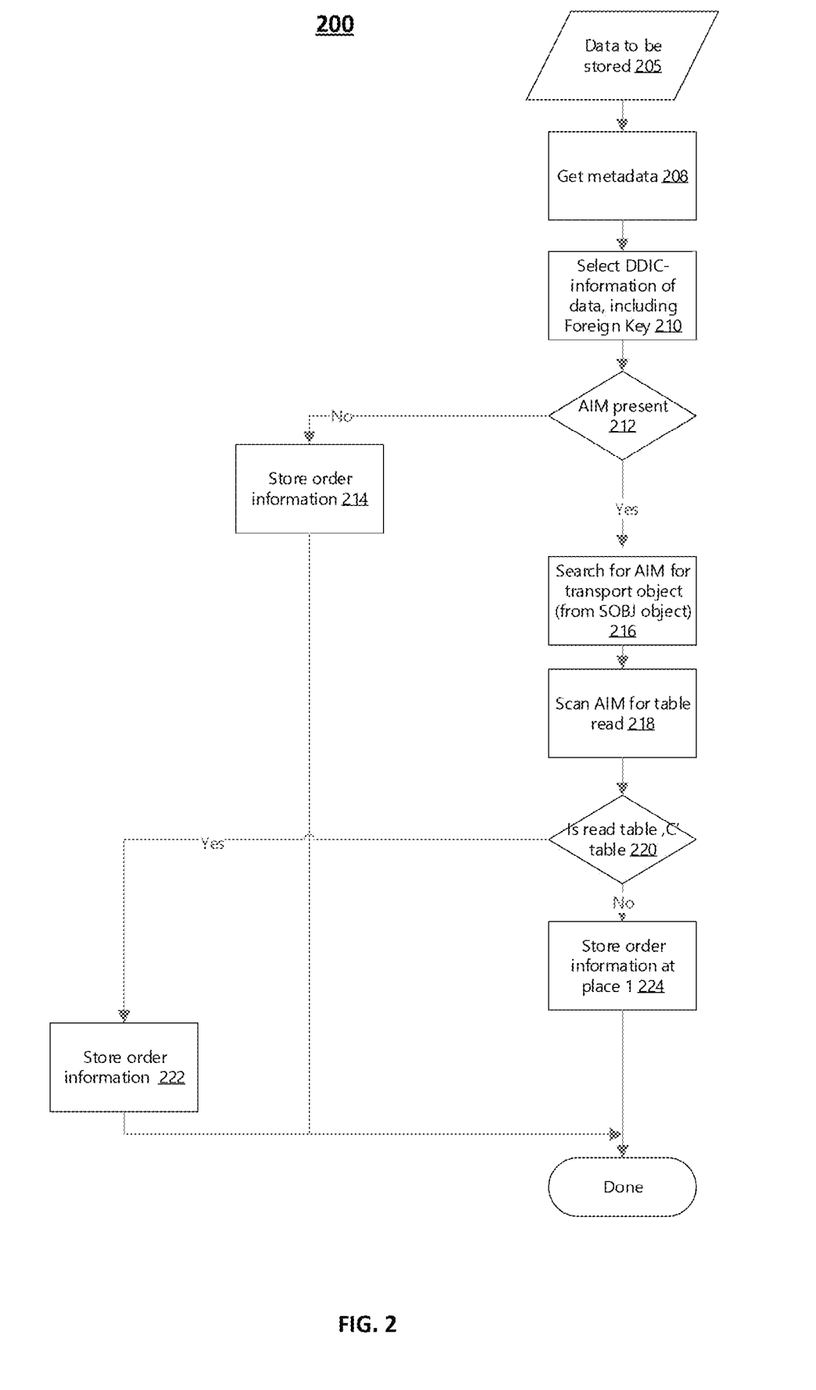
FIG. 2 depicts an example of a process for calculating order dependency, in accordance with some example embodiments.

FIG. 2 depicts an example of a process 200 for calculating order dependency based on FKs and AIMs, in accordance with some embodiments.

At 205, a table including data to be imported to a target system is identified and/or obtained. For example, the activation engine 199 may identify at least one database table at the database 160B of the development system 120B for importation into the target, production system 120A and database 160A. Although this example describes identifying a database table, a plurality of database tables may be identified as well. Furthermore, the identification may include identifying a data structure, such as an object including data (e.g., contained in database tables associated via FKs) and methods. Referring to FIG. 1B for example, the table 1 may be identified or object 1.

At 208, metadata may be obtained from a data dictionary, and metadata may be obtained for after import methods. For example, the activation engine 199 may get metadata from a data dictionary associated with the database tables, such as tables A-D and tables 1-4. And, the activation engine may get metadata about any AIMs associated with those tables or their corresponding objects.

To illustrate further, the metadata from the data dictionary may include the identity of the FKs, such as FK1, FK2, and FK3. For example, the metadata about FK1 may identify tables A and B and, in particular, a specific field in each of tables A and B. In this example, FK1 may link a field (e.g., a cell) in table B which reads from a specific field at table A. The FKs describe the connections and thus associations among database tables.

The metadata about the AIMs may indicate which tables are read from or written to by other database tables. This metadata information provides insight into the dependency of a table, the structure of the database table connections to other database tables, and the data contained in that table is. Referring to FIG. 1C, metadata about the AIM associated with object 2 may comprise code, script, or other data. And, this metadata about the AIM may indicate that table D is read from by table E, so table E depends from the data results of table D.

Referring to FIG. 1D, suppose there are three tables, table T1 with fields A, B, C, table T2, with fields D, E, and F, and table T3 with fields G, H, I, and J. In this example, field I has a foreign key connection to table T2, field D. As such, all entries in this field I have to be in table T2, field D. Field F has a foreign key connection to table T1, field A. As such, all entries in this field, F, have to be in T1, field A. In the example of FIG. 1, the activation engine may determine the order as fill data for table T1 first, then, T2, then T3. This information is obtained at 210 and stored as order information in the order table at 214. Given an insert of a table T4 with fields K, L, M, and N (and this table T4 has an AIM of F GENERATE DATA), the AIM reads data M from table T4 and data E from table T2, so this AIM is run after data is written to T2 at E (see, yes at 220 and 222).

At 210, the activation engine 199 selects, for the table identified at 205, the data dictionary information including FKs. For a given database table A for example, the FKs may indicate that database table B depends from table A, and database table C depends from table B, and database table D depends from database table C as shown at FIGS. 1A-B at 166C.

If the metadata associated with the identified table does not include AIM (No at 212), the activation engine 199 may store the order information for the database table as determined from the FKs selected from the metadata. This order information may be stored in a table listing the import order of the tables, an example of which is shown at Table 1 below as an "order table."

If the metadata associated with the identified table does include AIM (Yes at 212), the activation engine 199 may, at 216, search (e.g., scan) for metadata. For example, source code, script, or instructions may be associated with the tables or an object. Referring again to FIG. 1C, the second object (object 2) may be associated with an AIM. In this example, scanning (or searching) for the AIM in source code associated with the second object may indicate that the second object includes an AIM.

At 218, the AIM is checked to see which tables the AIM reads from during execution of the AIM. For example, the AIM at FIG. 1C may read from table E. The table read defines the dependencies after the AIM. Referring to FIG. 1D, the AIM of F GENERATE DATA reads data M from table T4 and data E from table T2.

If the AIM does read data from a table (yes at 220), the order information is stored in a table listing the import order of the tables, such as the order table shown at Table 1 below. If the AIM does not read data (No at 220), the order for the table can be stored at the top of the order table. If there is no data (which are required for the AIM), the data for this table can be written early in the process to have all writes done before other steps are running.

To store the order information as indicated at 214, 222, and 224, an ordered list may be created and stored by the activation engine 199 in order to track the required order of the database tables including data being imported as part of, for example, storage into the target system, such as production system 120A including database 160A. Table 1 below depicts an example of an "order table".

TABLE 1

An example of an order table

| Order number | Object | Table | FK-field | FK-table | AIM | AIM Table read | AIM table write | Leave blank |
|---|---|---|---|---|---|---|---|---|
| | X1 | 1 | A | T2, field E | | | | |
| | | 2 | D | T3, fieled I | | | | |

TABLE 1-continued

An example of an order table

| Order number | Object | Table | FK-field | FK-table | AIM | AIM Table read | AIM table write | Leave blank |
|---|---|---|---|---|---|---|---|---|
| | | 2 | F | T1, field A | | | | |
| | | 2 | E | T4, field M | F_Generate_Data | Yes | No | |
| | | 3 | I | T2, field D | | | | |
| | | 4 | M | T2, field E | F_Generate_Data | Yes | No | |

Table 1 depicts a column for the order number, an identifier for the object, an identifier for the database table associated with the object, a FK-field representative of a specific field (e.g., entry) in the database table that the FK points to, an FK-table representative of a specific database table that the FK points to, an identifier of an AIM, what database table the AIM reads, what table the AIM writes to, and leave blank for possible extensions to the table. Thus, the order table of Table 1 is used to order the dependencies between the different objects, such as the tables.

When an object is entered along with the dependency information (e.g., FK-field and FK-table, and/or AIM) into the order table, the activation engine 199 may check whether a given database table (e.g., the table being processed at 206) is already part of the order table. For example, the activation engine may check whether database table A is listed in the table column or listed in the FK-table column. In this example, the database table 1 is in order table. If it is part of the list of tables of the order table, the activation engine checks if the predecessor from the FK-connection (or AIM connection) is already in the list. If it the table is earlier than the FK connection or AIM, the activation engine can use the order listed in the order table. If however, the table is after, the activation engine may have found a circle connection among tables, so an exception is called for special handling. If a database table, such as database table 2, is not part of the list, the activation engine searches for a predecessor database table and stores the new database table (which is database table B in this example) in the ordered list after the predecessor.

Figure 3:
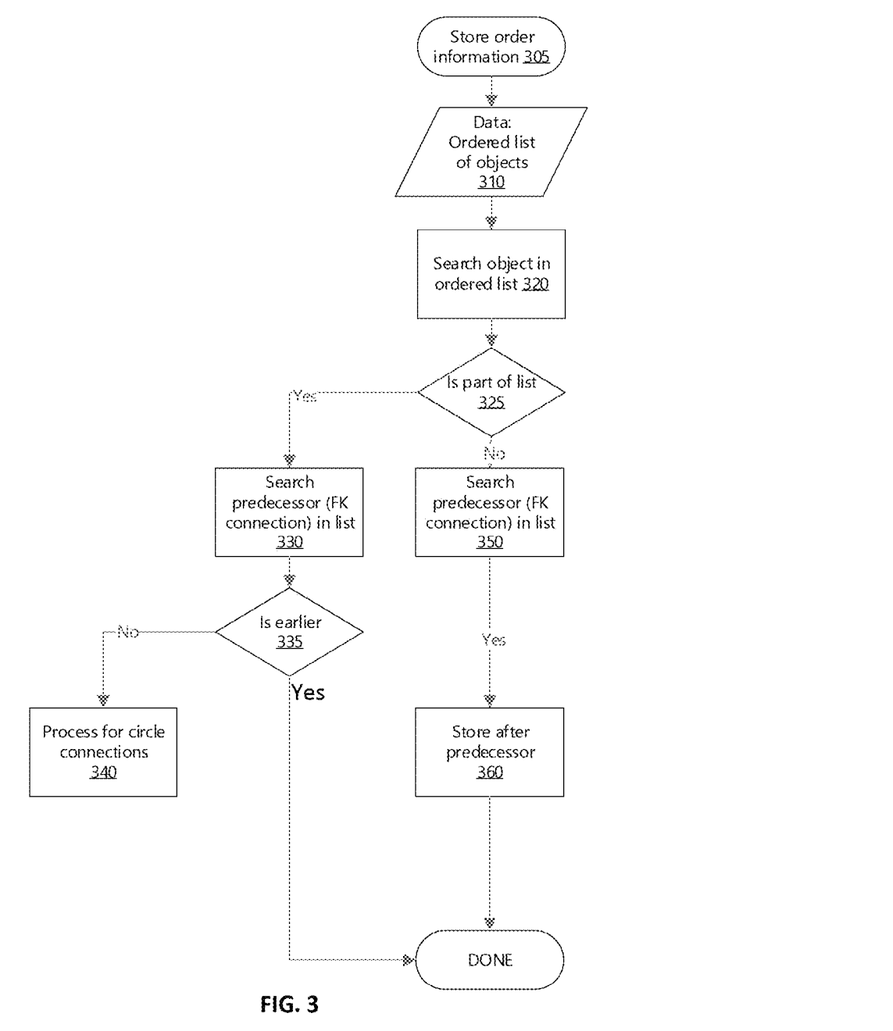
FIG. 3 depicts an example of a process for using an order table, in accordance with some example embodiments.

FIG. 3 provides an example implementation of the above-noted order table processing. To store order information, at 305, for database tables being imported into a target system, the activation engine 199 may, at 310, store a variety of information to enable a determination of a proper order for the database tables. For example, the activation engine may store object and database table information into the ordered list as noted above with respect to FIG. 2 and as shown in the ordered table (see, e.g., Table 1 above).

At 320, the activation engine 199 may search the ordered list for an object. For example, the activation engine may search to see if a database table is already included in the order table of Table 1, for example. To illustrate further, a table 3 (FIG. 1D) may be searched to see if it is listed in the order table. This may be performed as for example, a database call to select the database table 3 from the order table.

If the object being searched for is part of the ordered list of the order table (Yes at 325), the activation engine may, at 330, search for a predecessor object, such as a database table, in the ordered list of the order table, such as Table 1.

For example, the activation engine 199 may search for a predecessor object by searching for a FK connection's predecessor. The activation engine may select, or identify, all foreign key connections and selects the corresponding tables (which are required by the foreign key connection) as these predecessor connections and tables have to be treated as predecessors. Referring to the previous example of table 3 (FIG. 1D), the activation engine searches for predecessor connections, such as FK 166A, and corresponding table 2 of FIG. 1D. If the predecessors (e.g., FK 166A and table 2) are listed earlier than table 3 (yes at 335) in the order table, the activation engine can use the order provided by the order table. If the predecessors (e.g., FK 166A and table 2) are not listed earlier than table 3 (no at 335) in the order table of Table 1, the activation engine may have found a circle connection, so an exception is called for special handling in accordance with FIG. 4A, for example.

If the object being searched for is not part of the order list (No at 325), the activation engine may, at 350, search for a predecessor object, such as a database table, in the ordered list of the order table. Assuming table 4 of FIG. 1D is not included in the ordered table for example, the activation engine 199 may search for a predecessor object, such as a predecessor FK connection or predecessor database table. In this example, the activation engine may search for a predecessor FK 166B to table 2, field E. When the predecessor such as table 2 is found, the activation engine may store, at 360, the current table (which in this example is table 4) after table 2 in the order table. The process at FIG. 3 may also be used to determine where in the order table to store a database table.

When a circular connection among database tables is detected at for example 340, an exception is called for special handling. The special handling may include the activation engine 199 storing a database table twice in the ordered list of the order table. In the first store, the activation engine writes the database table entry without the field of the circle connection, then the activation engine writes all other database tables and updates the data using the final data. To persist this information, the activation engine uses the a "Leave blank" column or flag in the order table. This is done by setting the order number to the first number of the tables of the list of the circle tables. The flag for circle dependency is set to it and the name of the table field, which has to be empty in the first activation. This process is example with respect to FIGS. 4A and 4B.

Figure 4A:
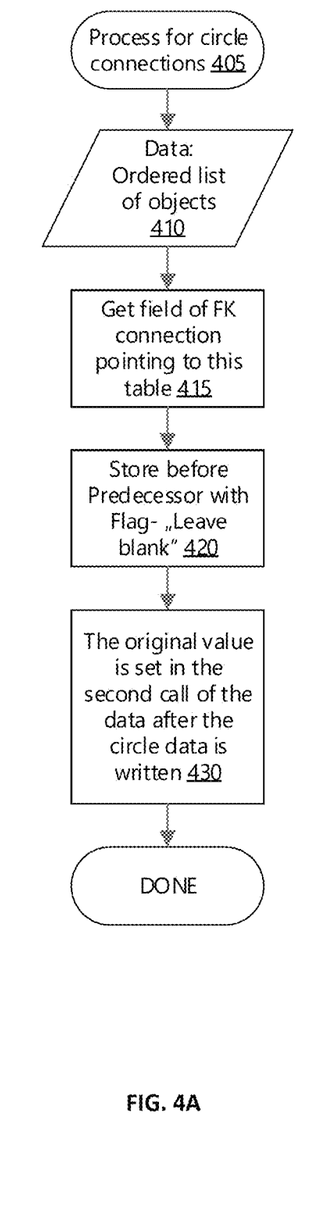
FIG. 4A depicts a process for handling circular foreign key connections, in accordance with some example embodiments.

FIG. 4A depicts an example of a process 405 for special handling of circular connections detected at 340.

At 410, the activation engine 199 accesses the order table of objects an example of which is depicted at the order table of Table 1 above. At 415, the activation engine gets a field of an FK connection pointing to a database table At 415, the activation engine 199 gets the FK connection pointing to a database table. Given for example database table 1 of FIG. 4B, the activation engine gets the FK connections 412A and 412B. In this example, 412A is a read of database table 2 at field G, while FK 412B represents database table 3 reading from field A of database table 1. At 430, the activation engine 199 stores, before the predecessor, a flag blank. At 430, the activation engine stores the original value (previously set as blank) in the second call of the data after the circle data is written.

Figure 4B:
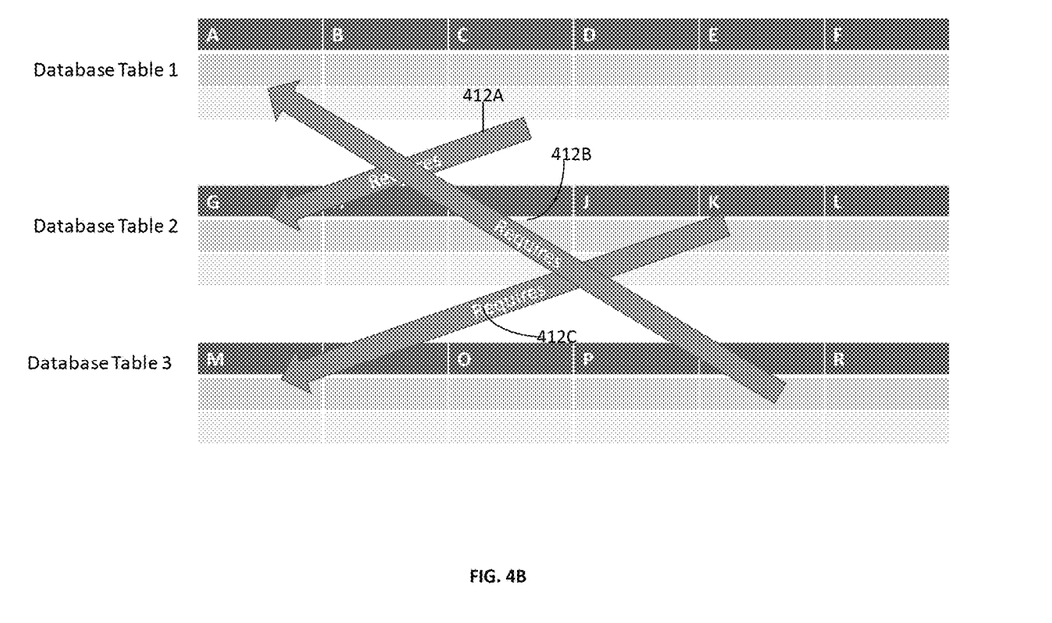
FIG. 4B depicts examples of database tables which are circularly associated via foreign keys, in accordance with some example embodiments.

FIG. 4B depicts an example of circular connections among database tables. In this example, database table 1, field C requires (as shown by FK 412A) filed G of table 2, so field G and field C be filled with the same value. Database table 2, field K requires (as shown by FK 412C) that database table 3, field M be filled with the same value. And, database table 3, field Q requires (as shown by FJ 412B) that table 1, field A be filled with the same value. The solution is a serialization of the process described above with respect to FIG. 4A. In other words, a table of the circle is deployed but without the data required by other tables in the circle. The second database table in the circle is deployed, then the third. At the end of the circle, the first table of the circle is re deployed, but now with the data (which was previously left blank).

In accordance with the process at FIG. 4A, the activation engine stores, at 420, fields A, B, D E, and F in the order table before its predecessor tables 2 and 3 s but leaves field C blank (inserting a flag or other indicator for field C). Next, the activation engine stores, at 420, fields G H, I, J, and L of table 2 in the order table but leaves field K blank (inserting a flag or other indicator for field K). And then, the activation engine stores, at 420, all of the fields of table 3 M, N, O, P, Q, and R. At 430, the activation engine then redeploys by replacing the "flag" for field C in the order table with the value found in G and replacing the "flag" for field K in the order table with the value M. In this way, the circular references to tables 1-3 are serialized.

Figure 5:
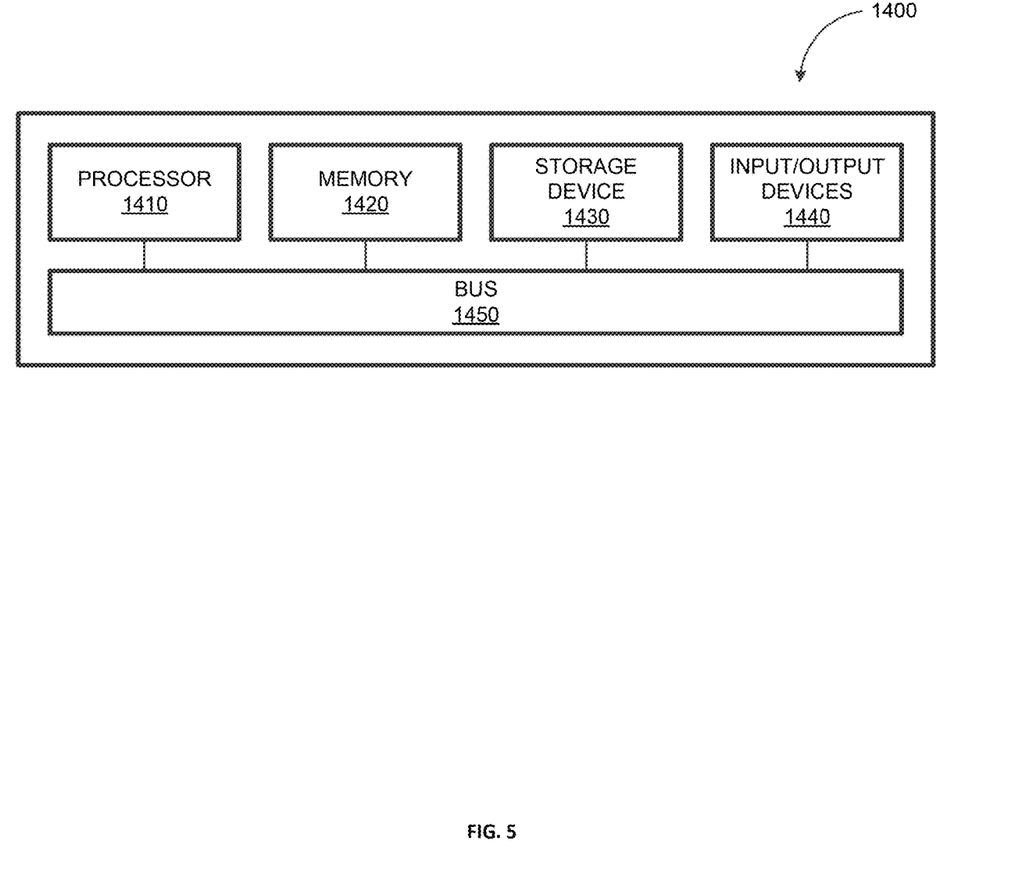
FIG. 5 depicts a block diagram illustrating a computing system, in accordance with some example embodiments.

FIG. 5 depicts a block diagram illustrating a computing system 4100 consistent with implementations of the current subject matter. Referring to FIGS. 1-4A-B, the computing system 1400 can be used to implement the activation engine 199 and/or any components depicted at FIG. 1A. As shown in FIG. 5, the computing system 1400 can include a processor 1410, a memory 1420, a storage device 1430, and input/output devices 1440. The processor 1410, the memory 1420, the storage device 1430, and the input/output devices 1440 can be interconnected via a system bus 1450. The processor 1410 is capable of processing instructions for execution within the computing system 1400. Such executed instructions can implement one or more components of, for example, the activation engine 199. In some implementations of the current subject matter, the processor 1410 can be a single-threaded processor. Alternately, the processor 1410 can be a multi-threaded processor. Alternately, or additionally, the processor 1410 can be a multi-processor core. The processor 1410 is capable of processing instructions stored in the memory 1420 and/or on the storage device 1430 to display graphical information for a user interface provided via the input/output device 1440.

The memory 1420 is a computer readable medium such as volatile or non-volatile that stores information within the computing system 1400. The memory 1420 can store data structures representing configuration object databases, for example. The storage device 430 is capable of providing persistent storage for the computing system 400. The storage device 1430 can be a solid-state device, a floppy disk device, a hard disk device, an optical disk device, a tape device, and/or any other suitable persistent storage means. The input/output device 1440 provides input/output operations for the computing system 1400. In some implementations of the current subject matter, the input/output device 440 includes a keyboard and/or pointing device. In various implementations, the input/output device 1440 includes a display unit for displaying graphical user interfaces.

According to some implementations of the current subject matter, the input/output device 1440 can provide input/output operations for a network device. For example, the input/output device 1440 can include Ethernet ports or other networking ports to communicate with one or more wired and/or wireless networks (e.g., a local area network (LAN), a wide area network (WAN), the Internet).

In some implementations of the current subject matter, the computing system 1400 can be used to execute various interactive computer software applications that can be used for organization, analysis and/or storage of data in various (e.g., tabular) format (e.g., Microsoft Excel®, and/or any other type of software). Alternatively, the computing system 1400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 1440. The user interface can be generated and presented to a user by the computing system 1400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the at least one data processor, result in operations comprising:
   importing database tables from a source system to a target system, the importing of the database tables performed in a sequence found in an order table, wherein the sequence determination of the order table is determined by at least:
   obtaining, from a data dictionary, a first metadata about a foreign key association for a first database table to at least one of the database tables;
   obtaining, from a scan of code, a second metadata about an after import method for the first database table;
   in response to the second metadata representing that the after import method does not exist for the first database table, storing the first database table in the order table; and
   in response to the second metadata representing that the after import method does exist for the first database table, scanning for a first indication that the after import method corresponds to a read of at least one other database table before storing the first database table in the order table.

2. The system of claim 1 further comprising:
   searching the order table for a database table to determine if the database table is included in the order table.

3. The system of claim 2 further comprising:
   in response to the database table being included in the order table, searching for a predecessor object, wherein the predecessor object comprises a predecessor database table and/or a predecessor foreign key connection to the database table.

4. The system of claim 2, further comprising:
   in response to the predecessor object being listed in the order table earlier than the database table, using the order table for the sequence when storing the database table.

5. The system of claim 2, further comprising:
   in response to the predecessor object not being listed earlier than the database table, flagging in the order table a circle connection associated with the database table.

6. The system of claim 5, further comprising:
   processing the circle connection by storing the database table in the order table and leaving blank at least one field which is read from at least one of a plurality of other database tables that are a part of the circle connection; and
   filling the at least one field left after the other plurality of other database tables are stored in the ordered list.

7. The system of claim 2 further comprising:
   in response to the database table not being included in the order table, searching for a predecessor object and then storing the database table in the order table after the predecessor object.

8. The system of claim 1, wherein the sequence determination of the order table is determined for each of the database tables being imported.

9. The system of claim 1, further comprising:
   in response to the second metadata representing that the after import method does exist for the first database table and in response to the after import method not requiring the read of the at least one other database table, storing the first database table at an earlier position in the order table when compared the at least one other table.

10. A method comprising
    importing database tables from a source system to a target system, the importing of the database tables performed in a sequence found in an order table, wherein the sequence determination of the order table is determined by at least:

obtaining, from a data dictionary, a first metadata about a foreign key association for a first database table to at least one of the database tables;

obtaining, from a scan of code, a second metadata about an after import method for the first database table;

in response to the second metadata representing that the after import method does not exist for the first database table, storing the first database table in the order table; and in response to the second metadata representing that the after import method does exist for the first database table, scanning for a first indication that the after import method corresponds to a read of at least one other database table before storing the first database table in the order table.

11. The method of claim 10 further comprising:
searching the order table for a database table to determine if the database table is included in the order table.

12. The method of claim 11 further comprising:
in response to the database table being included in the order table, searching for a predecessor object, wherein the predecessor object comprises a predecessor database table and/or a predecessor foreign key connection to the database table.

13. The method of claim 11 further comprising:
in response to the predecessor object being listed in the order table earlier than the database table, using the order table for the sequence when storing the database table.

14. The method of claim 11 further comprising:
in response to the predecessor object not being listed earlier than the database table, a flagging in the order table a circle connection associated with the database table.

15. The method of claim 14, further comprising:
processing the circle connection by storing the database table in the order table and leaving blank at least one field which is read from at least one of a plurality of other database tables that are a part of the circle connection; and
filling the at least one field left after the other plurality of other database tables are stored in the ordered list.

16. The method of claim 11 further comprising:
in response to the database table not being included in the order table, search for a predecessor object and then storing the database table in the order table after the predecessor object.

17. The method of claim 10, wherein the sequence determination of the order table is determined for each of the database tables being imported.

18. The method of claim 10, further comprising:
in response to the second metadata representing that the after import method does exist for the first database table and in response to the after import method not requiring the read of the at least one other database table, storing the first database table at an earlier position in the order table when compared the at least one other table.

19. A non-transitory computer-readable storage medium including program code which when executed by at least one processor causes operations comprising:
importing database tables from a source system to a target system, the importing of the database tables performed in a sequence found in an order table, wherein the sequence determination of the order table is determined by at least:
obtaining, from a data dictionary, a first metadata about a foreign key association for a first database table to at least one of the database tables;
obtaining, from a scan of code, a second metadata about an after import method for the first database table;
in response to the second metadata representing that the after import method does not exist for the first database table, storing the first database table in the order table; and
in response to the second metadata representing that the after import method does exist for the first database table, scanning for a first indication that the after import method corresponds to a read of at least one other database table before storing the first database table in the order table.

* * * * *